United States Patent [19]
Sutton

[11] Patent Number: 5,867,643
[45] Date of Patent: Feb. 2, 1999

[54] RUN-TIME DATA TYPE DESCRIPTION MECHANISM FOR PERFORMANCE INFORMATION IN AN EXTENSIBLE COMPUTER SYSTEM

[75] Inventor: Carl D. Sutton, Palo Alto, Calif.

[73] Assignee: Apple Computer, Inc., Cupertino, Calif.

[21] Appl. No.: 554,409

[22] Filed: Nov. 6, 1995

[51] Int. Cl.[6] ................................................ G06F 11/30
[52] U.S. Cl. .............................. 395/184.01; 395/183.21; 395/704; 395/835; 395/838; 364/264.7; 364/267.4; 364/269.4; 364/264.4
[58] Field of Search .................................. 364/280, 230, 364/264, 264.4, 264.7, 267, 267.4, 267.2, 267.8, 267.91, 269.4; 395/704, 183.15, 183.21, 183.22, 184.04, 835, 837, 838, 184.01

[56] References Cited

U.S. PATENT DOCUMENTS

| | | | |
|---|---|---|---|
| 3,818,458 | 6/1974 | Deese | 340/172.5 |
| 3,906,454 | 9/1975 | Martin | 340/172.5 |
| 4,849,879 | 7/1989 | Chinnaswamy et al. | 364/200 |
| 5,347,649 | 9/1994 | Alderson | 395/600 |
| 5,581,482 | 12/1996 | Wiedenman et al. | 364/551.01 |

OTHER PUBLICATIONS

Horowitz et al, "Fundamentals of Computer Algorithms", Computer Science Press, Inc., pp. 48, 59, 263, 1978.

*Primary Examiner*—Emanuel Todd Voeltz
*Assistant Examiner*—Michael T. Richey
*Attorney, Agent, or Firm*—Ceasri and McKenna, LLP

[57] ABSTRACT

A run-time data type extension mechanism describes the kinds of performance information collected within a registry located in a main memory of a computer. The data type extension mechanism comprises a base node of a multi-linked tree data structure having associated therewith a buffer portion for storing the collected performance information and a description portion for describing that information. Writer entities specify the contents of these latter portions, i.e., the collected information and its description, at run time to provide an arrangement for dynamically extending the kinds of information collected at the registry.

11 Claims, 6 Drawing Sheets

RUN-TIME DATA TYPE DESCRIPTION MECHANISM FOR PERFORMANCE INFORMATION IN AN EXTENSIBLE COMPUTER SYSTEM

CROSS-REFERENCE TO RELATED APPLICATIONS

This invention is related to the following copending U.S. patent applications:

U.S. patent application Ser. No. 08/554,402 titled, EXTENSIBLE PERFORMANCE STATISTICS AND TRACING REGISTRATION ARCHITECTURE; and U.S. patent application Ser. No. 08/553,104 titled, SYNCHRONIZATION MECHANISM FOR PROVIDING MULTIPLE READERS AND WRITERS ACCESS TO PERFORMANCE INFORMATION OF AN EXTENSIBLE COMPUTER SYSTEM, each of which was filed on even date herewith and assigned to the assignee of the present invention.

FIELD OF THE INVENTION

The invention relates generally to collecting performance metrics for software executing on a computer and, more specifically, to a mechanism for describing the kinds of performance information collected by an operating system and applications of the computer.

BACKGROUND OF THE INVENTION

Software instrumentation generally includes software entities used for collecting, storing and retrieving performance metrics of a computer system. These software entities typically include writer entities for collecting the performance information and storing that information in a designated area of main memory, called a repository. The repository preferably holds the performance information for retrieval by reader entities, which may include application programs executing on the computer.

Namespace services impose a uniform structure on the information stored in repositories. A namespace is a collection of information managed by an operating system of the computer and a namespace service, or registry, is the entity that stores and organizes that information. The registry generally provides an application programming interface (API), which is a mechanism for an application program to obtain services from the operating system. APIs typically include a collection of system calls to the operating system requesting, for example, establishment of network connections on behalf of an application. Specifically, the application may, via system calls to the registry API, create, modify, request, add and delete information in the registry.

The performance information collected at the registry typically includes metrics relating to components of the computer system, such as a central processor unit (CPU), main memory, the operating system and input/output (I/O) system. Examples of the collected information include loading metrics of the CPU and bandwidth parameters of the memory, along with timing latencies for execution of a particular request involving the I/O system, e.g., how long it takes to complete the (entire or portions of the) request.

By collecting and retrieving performance information, the software instrumentation provides access to the internal state and behavior, i.e., "views", of the operating system and application software executing on the computer. Operating systems are complex pieces of software configured to, e.g., handle asynchronous events within a computer (such as interrupts from I/O devices), provide interprocess communication capabilities and implement complex network protocols. Operating systems also control execution of application programs; instances of those programs in execution are called processes.

Knowledge of the internal characteristics of an operating system and application processes is useful for debugging, optimization and design verification of a computer. The internal views provided by software instrumentation fall into two general categories: (i) tracing, which provides a view into the behavior of a software program by recording the time and details of its state at interesting points in a running system, and (ii) statistics, which record when and how resources, such as device drivers of the operating system, are used.

Tracing is a form of interprocess communication that enables a process to observe the execution of another process; a trace, therefore, consists of a display that chronicles the actions and results of that program execution. Specifically, the trace provides a detailed record of the program's execution path by, e.g., taking an application program and placing it under observation by a special routine that monitors the progress of the program.

Typically, primitive abstract data types are used by the writer entities to collect performance information, such as statistics and traces. These primitive data types generally include simple counters, histograms, maximum values, minimum values, averages and rates. In many cases, it may be desirable to expand upon the kinds of performance information collected by the writer entities to further enhance knowledge of the internal characteristics of software executing on the computer. In order to extend the types of information collected at the registry, however, it is necessary to describe that information so that the reader entities can manipulate the information.

A conventional way of describing type information involves designating name, type, length and offset parameters for each primitive data type. For example, a "flat" C data structure struct, set forth below, comprises primitive data type elements such as an integer of maximum value, an integer of minimum value, an unsigned count and a 64-bit int64 value.

```
struct {
    int max
    int min
    unsigned count
    int64 valuesum
};
```

| name | type | length (bytes) | offset (bytes) |
|---|---|---|---|
| "max" | MAX | 4 | 0 |
| "min" | MIN | 4 | 4 |
| "count" | COUNTER | 4 | 8 |
| "valuesum" | SUM | 8 | 16 |

Referring to the first primitive data type element shown above, max is the name of the integer data element having a type designator MAX, a length of 4 bytes and an offset, relative to the beginning of the structure, of 0 bytes.

This description convention is generally used for describing parameters of trace messages as well as statistics information stored in the registry. The data type elements, e.g., int, int, unsigned and int64, are primitive in that they are implemented by the hardware of the computer, whereas type designators max, min, count, and valuesum are abstract data types using those primitive data types.

Several known operating systems have capabilities to acquire and register performance information, such as trace messages and statistics. The UNIX® operating system uses various software entities, known as KMEM readers, to access performance information stored in data structures within privileged memory for purposes of, e.g., displaying that information. Here, the performance information is collected solely within the operating system and registration is effected with a symbol table of a compiler.

In UNIX, the description of data must be previously known to the readers because there is no description of the information in the running system. That is, data description information must be compiled into the KMEM readers. Since the readers must be aware of all possible data types prior to accessing the information, the extensibility of data collection is limited.

Another known registration mechanism allows applications to access performance information without knowledge of the various types of collected information. In other words, applications can query the operating system as to the existence and types of collected information. However, there is no mechanism in the operating system for describing newly-created data types for collecting performance information. Accordingly, although the collected information can be easily added to the registry, the reader entities must have knowledge of their types in order to access them.

Therefore, it is among the objects of the invention to provide a mechanism for extending the types of information collected and stored in a registry.

Another object of the present invention is to provide a mechanism for describing the kinds of information collected and stored in a registry.

SUMMARY OF THE INVENTION

Briefly, the invention relates to a run-time data type extension mechanism for describing the kinds of performance information collected within a registry located in a main memory of a computer. The data type extension mechanism comprises a base node of a multi-linked tree data structure having associated therewith a buffer portion for storing the collected performance information and a description portion for describing that information. Significantly, writer entities specify the contents of these latter portions, i.e., the collected information and its description, at run time to provide an arrangement for dynamically extending the kinds of information collected at the registry.

Preferably, the base node is an object having associated buffer and description elements. The base object node further contains both state information for specifying whether information collection is enabled or disabled for the node, and pointers to the buffer and description elements in memory. As noted, the arrangement among these associated, yet separate, elements allows for dynamically extending the kinds of information collected at the registry; collectively, these elements along with their common base object node provide a novel self-describing run-time extended data type object arrangement.

In the illustrative embodiment, the base node represents a single data item with a single abstract data type for collecting the performance information; as described further herein, data collection presented by each node of the tree can be independently enabled and disabled for the "life" of a node, i.e., until it is destroyed. The abstract data type association also remains for the life of the node; however, the values of the information stored in the buffer change as the performance information collected by the writers change. Therefore, the description of the information collected at the node remains for the life-time of the node, whereas the actual information remains for only as long as the node is enabled.

In accordance with an aspect of the invention, the buffer element is maintained separately from the description element to facilitate their independent management. This allows the buffer storage capacity allocated for the node to be "freed", i.e., re-allocated, without having to re-create the description associated with the information collected at the node. Thus, if the node is disabled, the allocated buffer storage can be freed.

By separating the collected performance information from its description, the invention reduces overhead needed for performance information collection. This is particularly advantageous when collecting a large number of statistics. That is, when collection of certain statistics are no longer interesting, the node is disabled and information storage capacity is saved by "returning" it to memory.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF ILLUSTRATIVE EMBODIMENT

Figure 1:
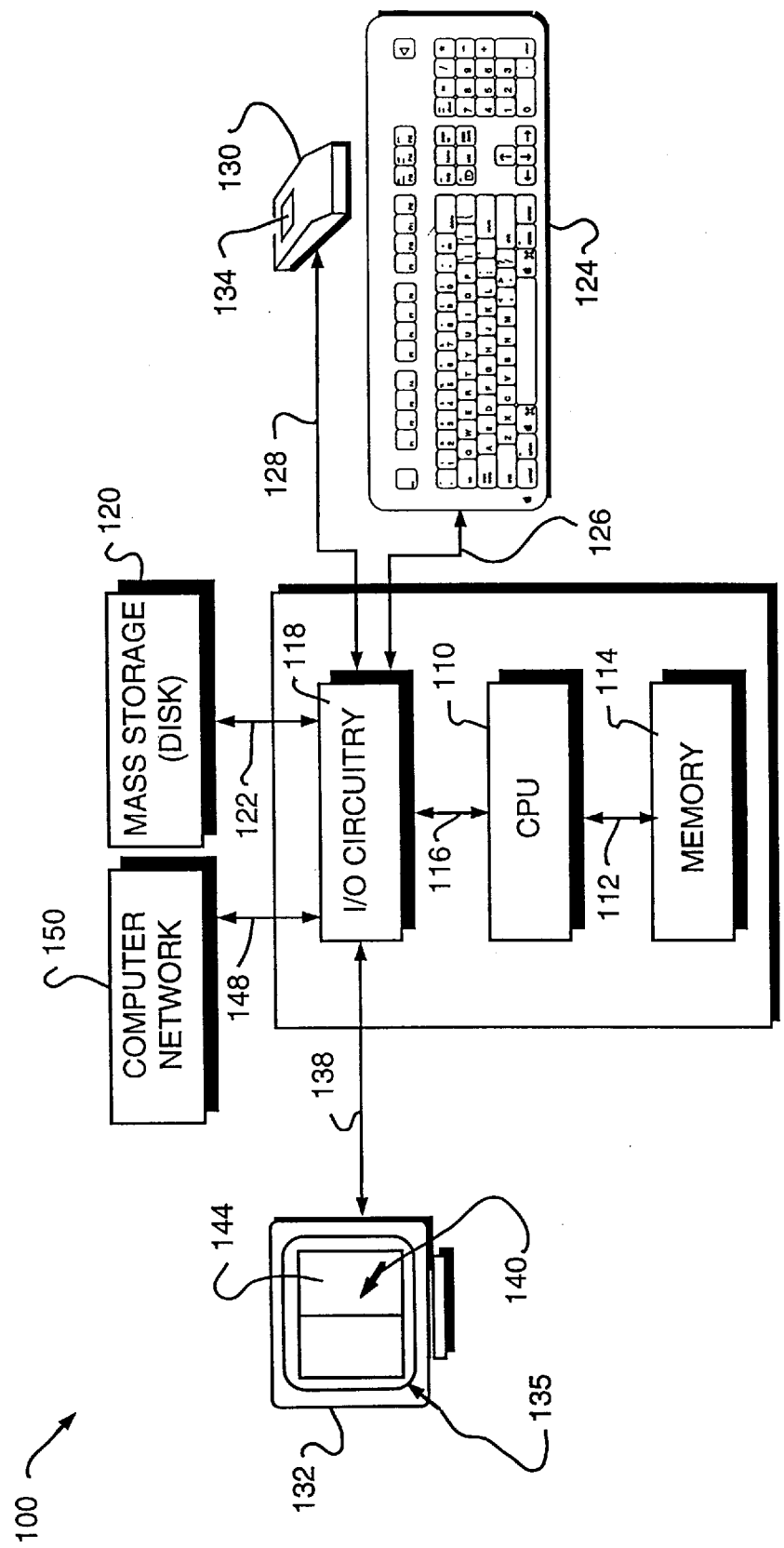
FIG. 1 is a block diagram of a computer, such as a personal computer, on which the invention may advantageously operate.

FIG. 1 illustrates a typical hardware configuration of a computer 100 comprising a central processing unit (CPU) 110 coupled between a main memory 114 and input/output (I/O) circuitry 118 by bidirectional buses 112 and 116. The memory 114 typically comprises random access memory (RAM) for temporary storage of information, including application programs (not shown), and read only memory (ROM) for permanent storage of the computer's configuration and basic operating commands, such as portions of an operating system (not shown). The application programs and operating system interact to control the operations of the CPU 110 and computer 100.

The I/O circuitry 118 is, in turn, connected to a mass storage unit 120, such as a disk drive, via a bidirectional bus 122 and to computer network 150 via bidirectional bus 148. Cursor/pointer control devices, such as a keyboard 124 and a mouse 130, connect to the circuitry 118 via cables 126 and 128, respectively. The mouse 130 typically contains at least one button 134 operated by a user of the system. A conventional display monitor 132 having a display screen 135 is also connected to I/O circuitry 118 via cable 138. A pointer (cursor) 140 is displayed on the screen 135 and its position is controllable via the mouse 130 or the keyboard 124, as is well-known.

Specifically, the I/O circuitry 118 receives information, such as control and data signals, from the mouse 130 and keyboard 124, and provides that information to the CPU 110 for transfer over the network 150, storage on the mass storage unit 120 or for display on the screen 135. It is to be understood that the I/O circuitry contains the necessary hardware, e.g., buffers and adapters, needed to interface with the control devices, the display monitor, the network and the mass storage unit. Moreover, the operating system includes the necessary software drivers to control, e.g., adapters within the I/O circuits when performing I/O operations, such as the transfer of data to and from the storage unit 120 and network 150.

The computer 100 is preferably a personal computer of the Macintosh® series of computers sold by Apple Computer Inc., although the invention may also be practiced in the context of other types of computers, including the IBM® series of computers sold by International Business Machines Corp. These computers have resident thereon, and are controlled and coordinated by, operating system software, such as the Apple® System 7®, IBM OS2®, or the Microsoft® Windows® operating systems.

Figure 2:
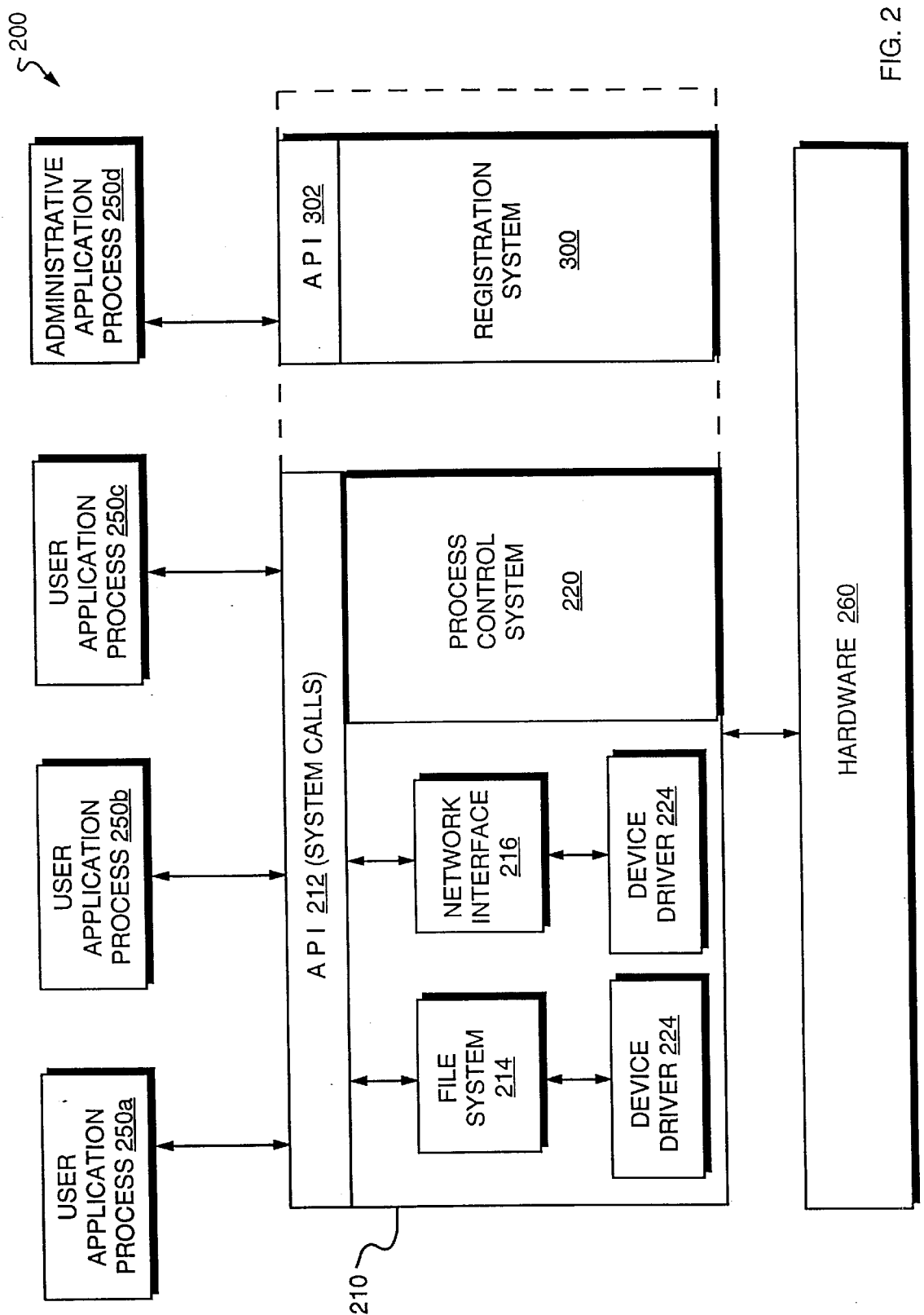
FIG. 2 is a highly schematized diagram of the hardware and software elements of the computer that includes a registration system of the invention.

FIG. 2 is a highly schematized block diagram of the hardware and software platform 200 of computer 100. As noted, instances of application programs executing on the computer 100 are manifested as processes 250. Although these application processes are typically user processes 250*a–c,* they may also include administrative processes 250*d* configured to perform various, "welfare-type" control functions described further herein. Administrative processes are typically distinguished from user processes only in the rights and privileges they are allowed.

Processes 250 typically interface with operating system 210 via system calls of an application programming interface (API) layer 212. Beneath the API layer are system facilities such as file system 214 and network interface 216, each of which directly implement those system calls. Process control system 220 provides basic capabilities of the operating system, such as interprocess communication and memory management.

The lower-layer of operating system 210 includes device drivers 224 for interfacing directly with the computer hardware 260. For each physical device, such as mass storage unit 120, a device driver is provided to accept requests to read and write data or determine the status of the devices. Communication between the physical devices and CPU 110 may be effected either through polling of the device drivers or via interrupts.

Located adjacent to operating system 210 is a registration system 300 configured to provide a hierarchical registration architecture which enhances the organization of performance information, such as statistics and tracing, collected by software instrumentation of the operating system and/or application programs executing on the computer. The "side-by-side" arrangement between the operating system 210 and registration system 300 enables the registration system to monitor the behaviour of the operating system and its various facilities. Accordingly, the registration system 300 includes its own, independent API communication facilities 302 for, inter alia, collecting performance information for the operating system 210.

Figure 3:
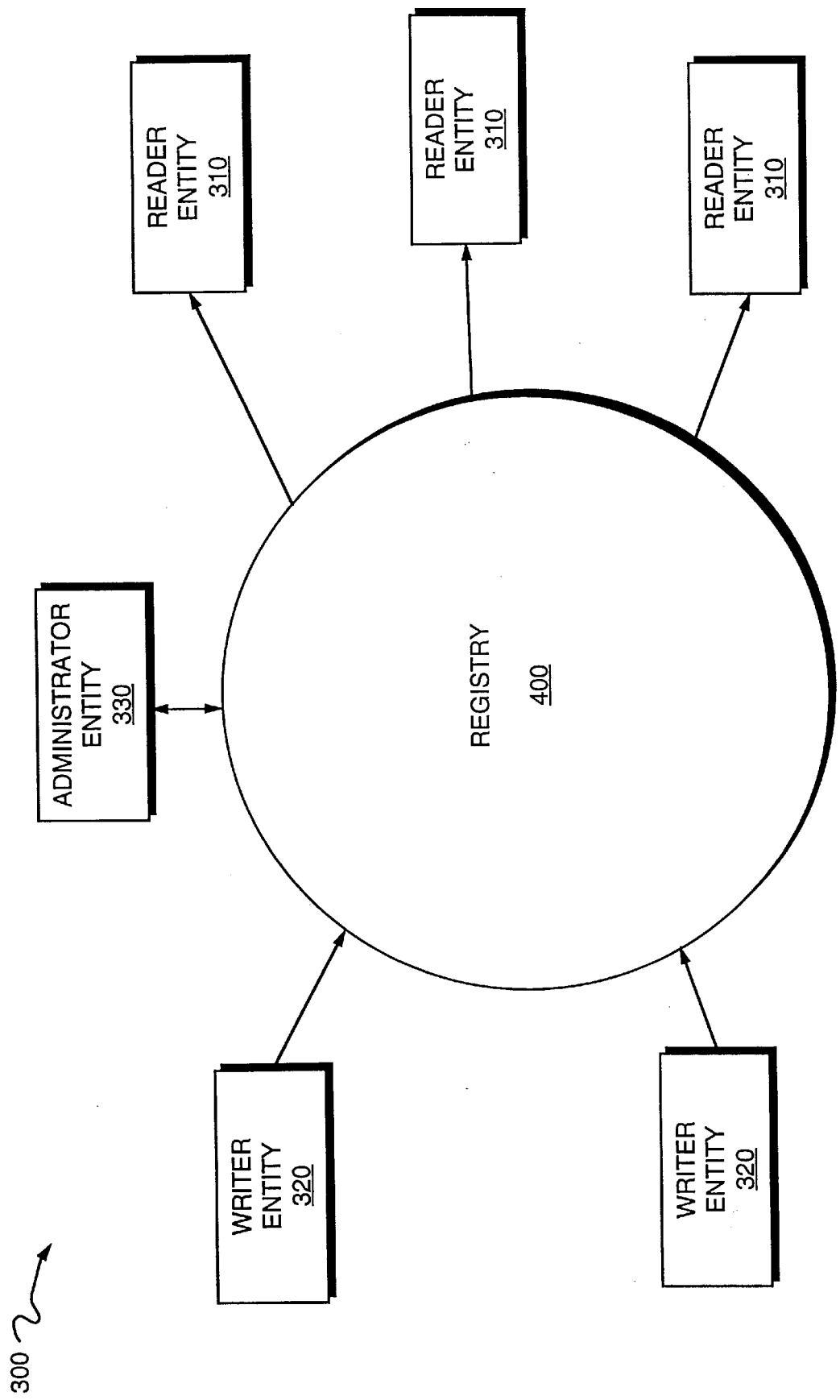
FIG. 3 is a highly schematized diagram of the registration system, including reader, writer and administrator entities interacting with a registry of the present invention.

FIG. 3 is a highly schematized diagram of the registration system 300 including software instrumentation of the present invention. In general, the software instrumentation comprises software entities for collecting, storing and retrieving performance information relating to the computer platform 200. That is, the software entities include a registry 400 for storing performance information collected by writer entities 320, retrieved by reader entitites 310 and controlled by an administrator entity 330.

The reader entities 310 typically include user application processes 250*a–c* desirous of obtaining performance information from the registry 400, while the writer entities 320 include those processes along with operating system components, such as device drivers 224, configured to collect performance information and "write" that information to the registry. The administrator entity 330 typically comprises adminstrative process 250*d* and is depicted as interacting with registry 400 via a two-headed arrow; this denotes that administrative process 330 is capable of directly writing information into and reading information from the registry 400 in connection with its overall control functions described herein.

Figure 4:
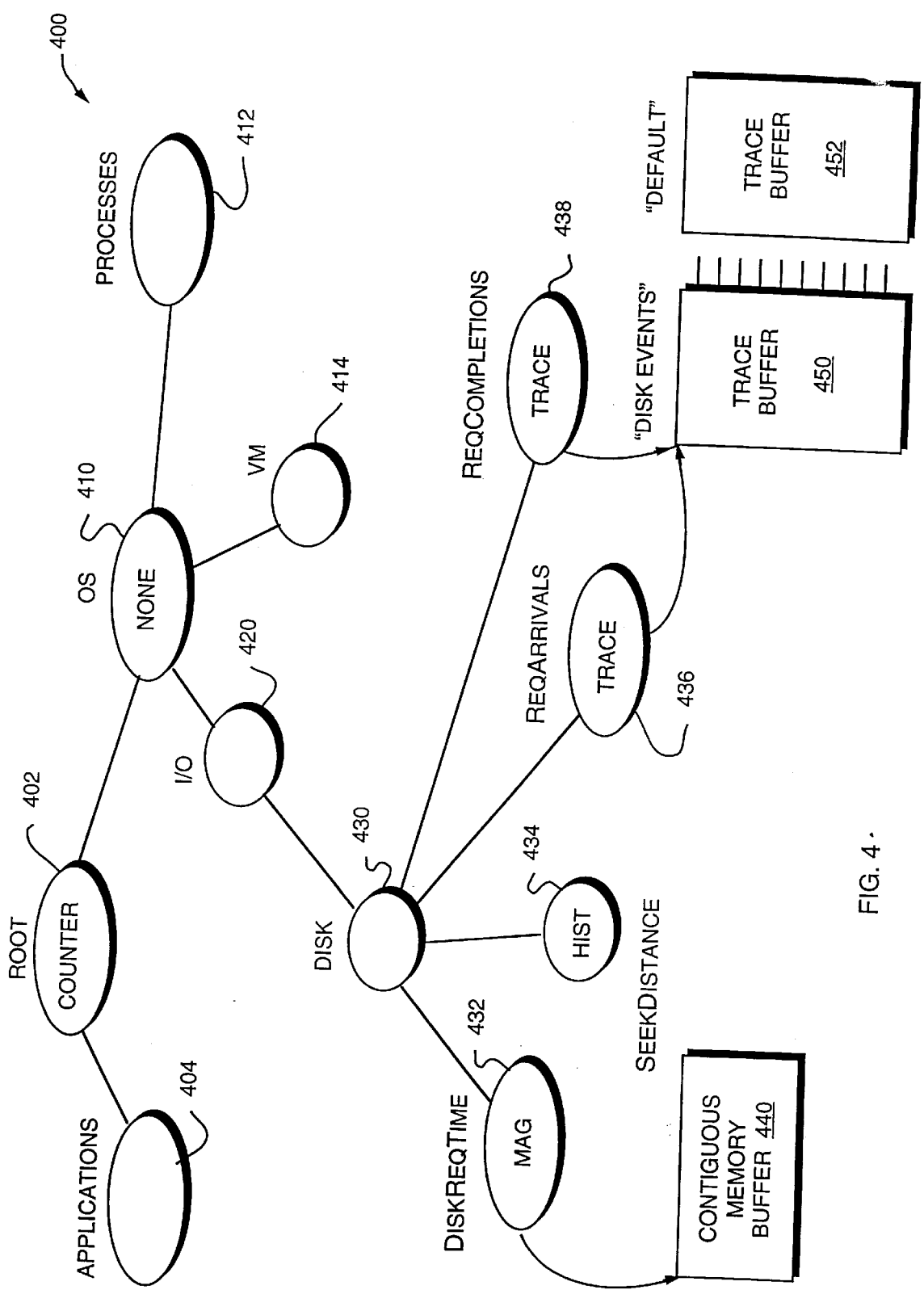
FIG. 4 is a block diagram of the registry for organizing and managing object nodes in accordance with the invention.

FIG. 4 is a block diagram of the registry 400 embodying a hierarchical tree data structure architecture of nodes for managing and organizing performance information, such as statistics and tracing, collected by writer entities 320. As described herein, each node represents a single data item with a single data type; in addition, data collection presented by each node of the tree can be independently enabled and disabled. The multi-linked tree structure is located within main memory 114 (FIG. 1) having a plurality of address locations for accessing the performance information. An example of a registry is provided in copending and commonly assigned U.S. patent application Ser. No. 08/554,402 titled Extensible Performance Statistics and Tracing Registration Architecture, filed on even date herewith, which application is incorporated by reference as though fully set forth herein.

In a preferred embodiment, the invention described herein is implemented as a dynamic object-oriented system, using C language in connection with object-oriented programming (OOP) techniques. The C language is well-known and many articles and texts are available which describe the language in detail. In addition, C compilers are commercially available from several vendors. In the interest of brevity, the details of the C language and the operation of its compiler will not be further discussed.

As will be understood by those skilled in the art, OOP techniques involve the definition, creation, use and destruction of "objects". These objects are software entities comprising data elements and routines, or functions, which manipulate the data elements. The data and related functions are treated by the software as an entity that can be created, used and deleted as if it were a single item.

Objects are defined by creating "classes" which are not objects themselves, but which act as templates that instruct the compiler how to construct an actual object. A class may, for example, specify the number and type of data variables and the steps involved in the functions which manipulate the data. Objects may be used by manipulating their data and invoking their functions.

The principle benefits of OOP techniques arise out of three basic principles: encapsulation, polymorphism and inheritance. Specifically, objects can be designed to hide, or encapsulate, all, or a portion of, its internal data structure and internal functions. Polymorphism is a concept which allows objects and functions that have the same overall format, but that work with different data, to function differently in order to produce consistent results. Inheritance, on the other hand, allows program developers to easily reuse pre-existing programs and to avoid creating software from scratch. The registration architecture described herein does not employ traditional inheritance mechanisms; instead, it employs a novel run-time data type extension mechanism that distinguishes the dynamic object-oriented nature of the system. That is, instead of determining the data type at compile time, that data type is determined at run time.

The writer entities 320 "register" their intent to collect and store performance information in registry 400 by creating objects as nodes organized within the tree structure. Specifically, the writer entities 320 are designated as various portions of the tree structure and the information they collect are also described as object nodes of the tree. Each object node is preferably named according to the performance information it collects and, also, the type of data with which it is associated. For example, the root object node 402 of registry 400 is named Root and has an associated counter (Counter) data type.

Readers, on the other hand, are entities that use or examine the information for purposes of displaying it on a computer screen, recording it to a disk or sending it over a network. There can be multiple entities reading and writing information simultaneously from and to the registry 400. Significantly, each reader entity has access to all of the information collected by the writer entities within the computer. The registration mechanism of the architecture described herein allows these writers to inform the readers with respect to information recorded in the registry 400.

For example, the OS node 410 collects performance information for the operating system software and, in the illustrative embodiment, is used merely as an organization mechanism for the lower nodes of the tree; accordingly, this node has no associated data type. The information collected at the lower nodes of the OS node are apportioned into categories such as process-related information at Process node 412, virtual memory performance information at VM node 414 and I/O-related information at I/O node 420. This latter node includes the collection of disk-related performance information at Disk node 430.

Specifically, the node that collects statistics pertaining to times for completing disk requests is DiskRequestTime node 432; as described further herein, this node has an associated magnitude (Mag) data type. In addition, SeekDistance node 434 provides a histogram (Hist) of seek distances on the disk, e.g., how far a disk head moves for each request, while ReqCompletions node 438 provides a trace (Trace) of disk request completion times and ReqArrivals node 436 also provides a trace (Trace) of disk request arrival times. As for these latter data types, whenever a request arrives at device driver 224, a trace event, i.e., a trace message containing a description of the request, is issued; an example includes a request to a disk driver to read a particular block on disk.

Examination of the data values associated with the object nodes indicates the frequency and traffic patterns of, e.g., requests arriving at the disk driver (i.e., whether there are long or short gaps between requests). Data values are described by abstract data types. As noted, primitive data types, such as simple counters, histograms, maximum and values, averages and rates, are typically used by the writer entities to collect statistics and trace messages. These data types are generally described above with respect to I/O system data collection; however, it is noted that the invention applies equally to collection of performance information from other entities, such as applications. For example, Applications node 404 is designated for collecting application-related performance information.

Storage of the performance information preferably occurs in globally-shared memory 114 so that any software entity can access or update the information. Portions of memory 114 are allocated as contiguous memory buffers 440 to those nodes configured to collect statistics information. That is, each of these "statistics" nodes, e.g., DiskReqTime node 432, contains a pointer to a contiguous portion of memory that is allocated to that node, e.g., data buffer 440. These allocated buffers are not shared among multiple nodes because the abstract data types for the statistic data structures are well-defined; accordingly, the amount of memory space allocated is specific to each data type.

In many cases, it may be desirable to expand upon the kinds of performance information collected by the writer entities to further enhance knowledge of the internal characteristics of software executing on the computer. In order to extend the types of information collected at the registry, however, it is necessary to describe that information so that the reader entities can manipulate the information.

Figure 5:
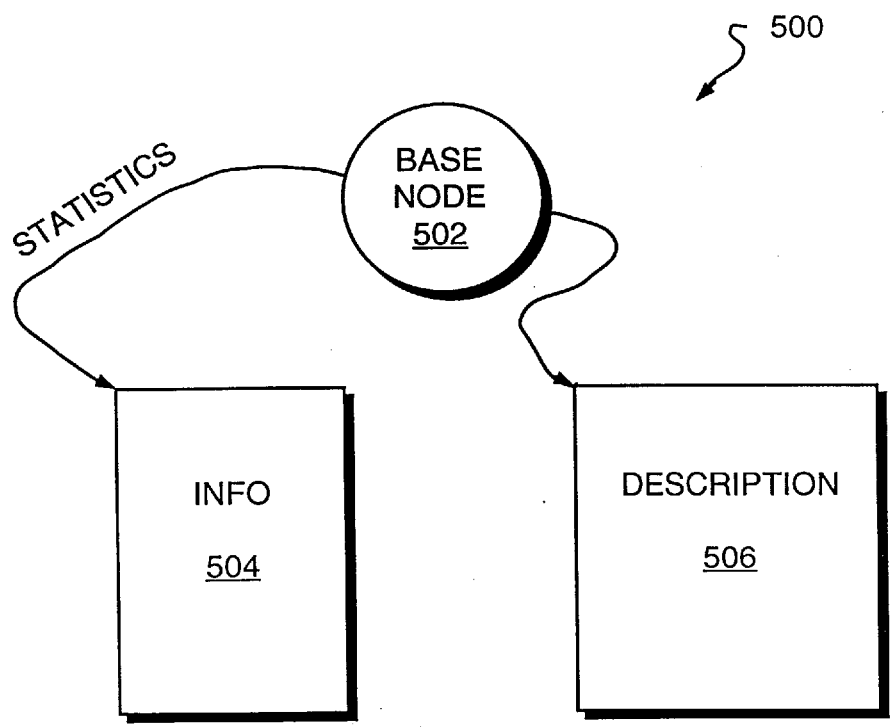
FIG. 5 is a block diagram of a novel run-time data type extension mechanism for describing the kinds of performance information collected within an object node of the registry using a buffer element and a description element in accordance with the invention.

In accordance with the invention, a run-time data type extension mechanism is provided for describing the kinds of performance information collected within the registry. FIG. 5 is a block diagram of the novel data type extension mechanism 500 comprising a base node 502 of the multi-linked tree having associated therewith a buffer (info) element 504 for storing the collected performance information and a description element 506 for describing that information. Significantly, writer entities specify the contents of these latter portions, i.e., the collected information and its description, at run time to further provide an arrangement for dynamically extending the kinds of information collected at the registry.

Preferably, the base node 502 is an object containing state information for specifying whether information collection is enabled or disabled for the node. Data collection presented by each node 502 can be independently enabled and disabled for the "life" of a node, i.e., until it is destroyed. According to the invention, the abstract data type association remains for the life of the node; however, the values of the information stored in the buffer 504 change as the performance information collected by the writers change. The description of the information collected at the node and stored within element 506 thus remains for the life-time of the node 502, whereas the actual information stored in element 504 remains for only as long as the node is enabled.

The base node 502 also contains pointers to the buffer and description elements 504, 506 in memory. The buffer info element 504 is maintained separately from the description element 506 to facilitate their independent management. Collectively, these associated, yet separate, elements (along with their common base object node) provide a novel self-describing run-time extended data type object arrangement. Such an arrangement allows the buffer storage capacity allocated for the node to be "freed", i.e., re-allocated, without having to re-create the description associated with the information collected at the node. Thus, if the node is disabled, the allocated buffer storage can be freed.

Referring again to FIG. 4, information storage for object nodes collecting trace information are provided by trace buffers 450, 452. As with the data buffers described above, the trace buffers are preferably linked to the trace nodes via pointers in those nodes. Unlike the contiguous memory buffers allocated to each statistics node, however, trace buffers are named and shared among multiple nodes primarily because of their large sizes.

Specifically, trace buffers are created in response to registration of object nodes in the registry 400; this is illustrated in FIG. 4 as trace nodes 436, 438 pointing to new shared trace buffer structure DiskEvents 450. If no trace buffer is specified for a particular trace node, that node points to a default buffer called Default trace buffer 452. It should be noted that trace buffers are used solely for tracing purposes.

Figure 6:
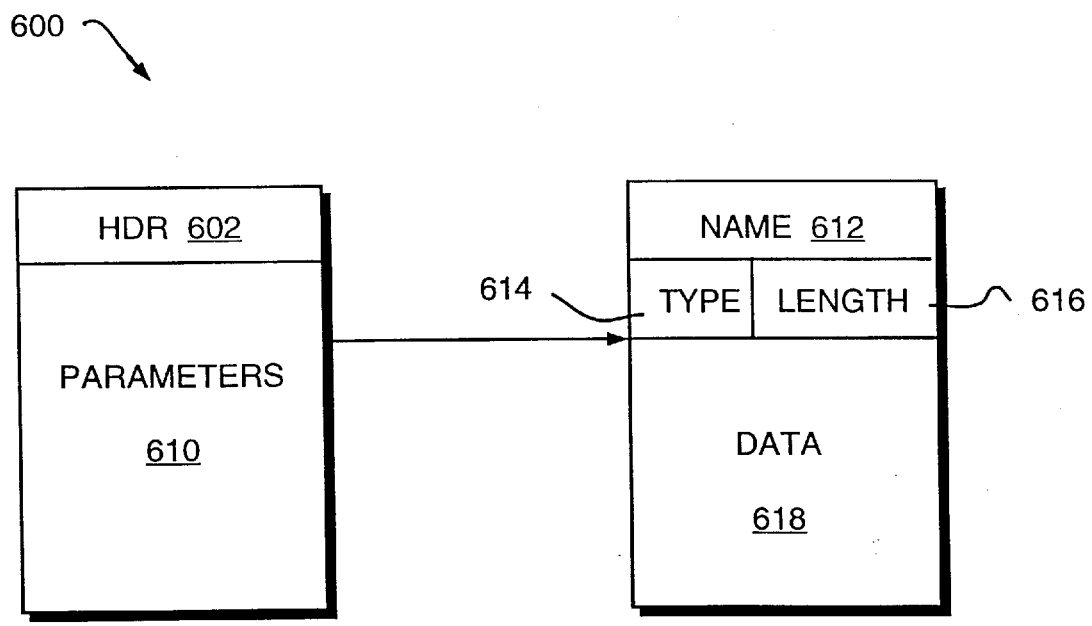
FIG. 6 is a block diagram of a trace message stored in a trace buffer in accordance with the invention.

The trace buffers are preferably configured as circular data buffers comprising various trace elements for storing multiple trace messages; according to their "circular" configuration, as new messages are added, the oldest ones are overwritten. Because of this structure, the trace information and its description are intermingled within the trace elements of the buffer. FIG. 6 is a block diagram of a variable-length trace message 600 stored in a trace buffer that is structurely equivalent to buffer 450.

Each trace message 600 preferably contains both trace information and its description. A header 602 contains a plurality of values, including a length indicating the length of the variable-length message; a generalized time stamp for measuring execution time between different points in a program when generating a trace and a creator that identifies the node or group of nodes issuing the message. Specifically, the creator identifies a writer entity, e.g., the file system 214, that creates a set of nodes in a sub-tree.

In addition, there is a "bookend" value that provides associations between entering and leaving messages, and a what field for specifying the nature of the trace message. Here, the what field may be used by a writer to indicate which node is generating the message. Although a particular node can generate multiple what values, multiple nodes may use that same value.

Beyond the header information, there is also a parameter field 610 comprising the intermingled, extendable information of the trace message. Each parameter of field 610 further includes information such as a name 612, a type 614, a length 616 and, of course, data 618. Examples of a name 612 may include a simple maximum data type or a complex magnitude type, the latter of which is described further herein.

Significantly, there are variable quantities of parameters in field 610 of trace message 600, with each parameter being of variable size depending on the particular data type. According to the invention, a writer entity establishes an abstract data type that explicitly describes the association between a node and a particular trace message; the what field is esssentially a hardware-level instruction word describing this particular message.

Operationally, the writer entities record performance information in the data buffers that the registration system 300 allocates to each node for each piece of information. The reader entities read that information from those buffers and perform various operations on it. The administrator entity controls whether any particular node's information collection is currently enabled or disabled. It is important that this latter function be controlled by a separate mechanism, e.g., a utility application, that is not directly under control of the writer.

Prior to collecting performance information for storage in registry 400, the writer entities 320 check whether collection is enabled for a particular piece of information. If a particular node is enabled, it collects the performance information and records that information in the registry. If the node is not enabled, then the writer cannot record the information. Hence, recording may be disabled for an object node; in the case of statistics collection, this implicitly "frees" the allocated memory buffer.

As a result of the tree structure architecture of the registry 400, the states of nodes with common ancestry may be modified as a group. That is, enablement and disablement of interior tree nodes, e.g., node 430 (FIG. 4), affect that node and all descendants of that node. Since extension nodes to the registry are typically created beneath a common node of the tree, information collection for the extensions can be controlled collectively or independently for each data element. As an example of the latter, the parameters within a disabled node can be changed, the node may be re-enabled and, if needed, a larger memory buffer may be allocated. The amount of memory associated with a node is thus fixed for the duration of enablement, and the node can be re-enabled to change that amount of allocated memory.

Although OOP offers significant improvements over other programming concepts, software development still requires significant outlays of time and effort, especially if no pre-existing software is available for modification. Consequently, a prior art approach has been to provide a developer with a set of predefined classes which create a set of objects and additional miscellaneous routines that are all directed to performing commonly-encountered tasks in a particular environment. Such predefined classes and libraries are typically called "frameworks" and essentially provide a pre-fabricated structure for a working document.

While the framework approach utilizes all the principles of encapsulation, polymorphism, and inheritance in the object layer, and is a substantial improvement over other programming techniques, there are difficulties which arise. These difficulties are caused by the fact that it is easy for developers to reuse their own objects, but it is difficult for the developers to use objects generated by other programs. Further, frameworks generally consist of one or more object "layers" on top of a monolithic operating system and even with the flexibility of the object layer, it is still often necessary to directly interact with the underlying system by means of awkward procedure calls.

In the same way that a framework provides the developer with prefab functionality for a document, a system framework, such as that included in the preferred embodiment, can provide a prefab functionality for system level services which developers can modify or override to create customized solutions, thereby avoiding the awkward procedural calls necessary with the prior art frameworks. For example, consider a customizable registration architecture framework which can provide the foundation for collecting, searching and obtaining performance information of software executing on a computer. A software developer who needed these capabilities would ordinarily have to write specific routines to provide them. To do this with a framework, the developer only needs to supply the characteristic and behavior of the finished output, while the framework provides the actual routines which perform the tasks.

A preferred embodiment takes the concept of frameworks and applies it throughout the entire system, including the application programs and the operating system. For the commercial or corporate developer, systems integrator, or OEM, this means all of the advantages that have been illustrated for a framework, such as MacApp, can be leveraged not only at the application level for things such as text and graphical user interfaces, but also at the system level for such services as printing, graphics, multi-media, file systems and, as described herein, performance information registration.

Referring again to FIG. 3, the reader entities 310, writer entities 320 and adminstrator entity 330 are software instrumentation elements of a registration system 300 having a customizable framework for greatly enhancing the ability of a writer entity to collect and store, and a reader entity to search for and obtain, performance information in registry 400. The customizable framework further provides a platform for third-party application and operating system developers to create custom reader and writer entities for operation on a variety of hardware and software computer systems.

As noted, the nodes of the registry are preferably implemented as objects and communication between the software entities and registry is effected through novel application programming interfaces (APIs). These APIs are preferably delivered in the form of objects in a class hierarchy that is extensible so that developers can create new object nodes. From an implementation viewpoint, the objects can be subclassed and can inherit from a base class to build customized nodes that allow software entities to collect and retrieve different types of data or to create nodes that function differently from existing nodes.

In accordance with the invention, the customized framework has a base class TreeNodes for defining and building object nodes. To further understand the operations of these objects, it may be useful to examine their construction together with the major function routines that comprise the behavior of the objects. The relation of the subclasses and the functions inherent in each class may be used to predict the behavior of an object once it is constructed.

Figure 7:
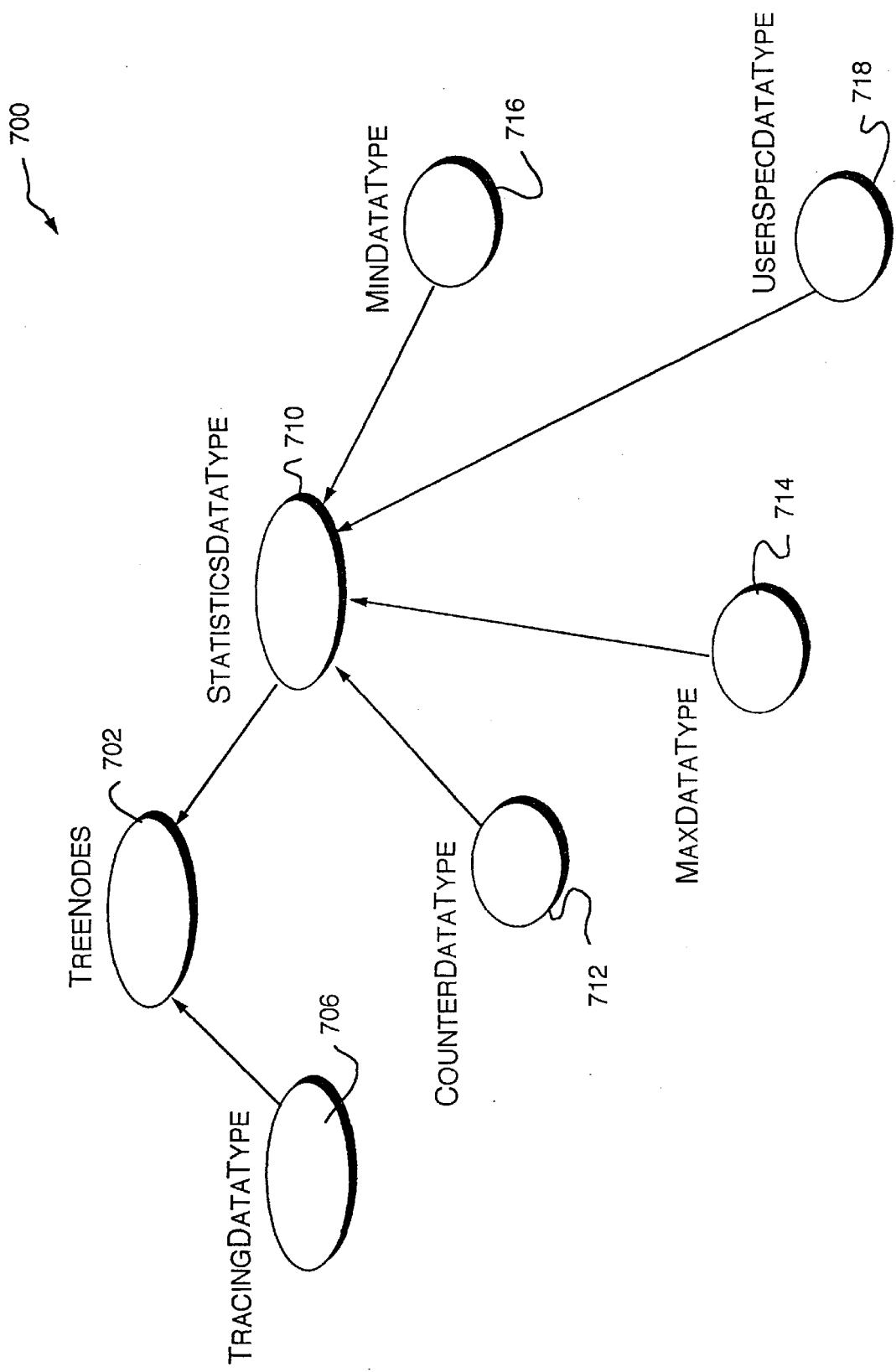
FIG. 7 is a simplified class hierarchy diagram of a base class TreeNodes used to construct the object nodes of the invention.

FIG. 7 illustrates a simplified class hierarchy diagram 700 of the base class TreeNodes 702 used to construct the object nodes. Subclasses of this base class include TracingDataType and StatisticsDataType classes 706 and 710 used to construct object nodes configured to collect various performance information for storage in the registry.

For example, the class StatisticsDataType 710 may be used to construct an object node for collecting statistics information, while the subclass CounterDataType 712 is derived from StatisticsDataType 710 and encapsulates an object node representing a counter comprising a simple unsigned 32-bit sum, the subclass MaxDataType 714 may be used to construct an object node for tracking the largest 32-bit unsigned value and the class MinDataType 716 is configured to encapsulate an object node tracking the smallest 32-bit unsigned value.

Since each of the classes used to construct these object nodes are subclasses of the TreeNodes base class, each class inherits the functional operators and methods that are available from that base class. For example, methods associated with the TreeNodes base class for creating a node are assumed by the subclasses to allow construction of the object nodes in a consistent manner. A sampling of the methods associated with the TreeNodes base class include (the arguments have been omitted for simplicity):
CreateNode ();
DestroyNode ();
Enable ();
Disable (); and
ClearStatistics ().

In accordance with another aspect of the invention, the classes of the registration architecture described above provide mechanisms for extending the data types used for information collection. Preferably, the data types are abstract data types ranging from primitives (such as simple counters, maximum values, minimum values, averages and rates) to user-defined data types consisting of either entirely new data types or combinations of existing primitive data types. An example of a single primitive data type involves the creation and use of a counter to record the number of requests issued to a disk. As a disk driver receives these requests, it simply increments the counter to record the number of requests received.

In contrast, an example of a user-defined data type consisting of combinations of existing primitive data types is a group of counters configured to collect an average time to complete the requests issued to a disk. Here, one counter counts the number of requests, while another counter sums the time to complete those requests; the average time is calculated by dividing the total summed time by the total number of counts. As will be apparent to those skilled in the art, a primitive data type may thus consist of a group of multi-valued data types, with each multi-valued data type consisting of a group of single-valued data types; this relationship may be further extended to the lowest-level data types supported by the computer hardware.

A user-defined abstract data type may be further created to collect a statistic comprising maximum and minimum times to complete each disk request. This new data type is preferably constructed from the subclass UserSpecDataType 718, which is derived from StatisticsDataType 710 and encapsulates an object node capable of summing the maximum and minimum times for the disk requests to determine their averages. According to the invention, each of these statistics may be grouped together as a magnitude data type, e.g., the magnitude of request time or request completion time. Hence, the magnitude of the maximum amount of time to complete any request is the worst-case request value and the magnitude of the minimum time is the best-case request value.

Referring to the flat, C data structure struct previously described herein, the overall sequence of the primitive element descriptions, e.g., int, int, unsigned and int64, is generally referred to as a magnitude data type using max, min, counter and sum data types. In accordance with the description convention, a caller identifies this higher-level, abstract data type by name and, further, identifies the contents of the magnitude data type by a primitive set of descriptions. The overall magnitude sequence may be described as having a name "magnitude", an abstract data type "MAGNITUDE", a length of 20 bytes, and an offset within the structure of 0 bytes. In the case of node 432 (FIG. 4) configured to collect statistics information, this description may be contained within description element 506 associated with that node.

By associating the collected information and its description together with a base node, such as node 502, an extensible system is provided that facilitates definition of new abstract data types. The information collected at node 502 has descriptive information associated with it in the form of "built-in" labels so that a display-type reader entity can display the information on a computer screen, in at least a primitive form using these labels. That is, because max, min, count and sum data type descriptions are built-in to the system, a reader would know how to display these data types; although it may not know how to display a magnitude type directly, given the description of the magnitude contents, the reader entity would be able to display that type in some manner.

Advantageously, the invention provides an arrangement for conserving memory resources when collecting performance information in a registry of a computer. Specifically, the novel base object node provides links to separate buffer and description elements that respectively store and described the collected performance information. By separating the performance information collected by writer entities from the description of that information, the invention further provides a self-describing run-time data type extension mechanism that reduces the required overhead for performance information collection.

While there has been shown and described an illustrative embodiment for organizing performance information in accordance with a hierarchical registration architecture, it is to be understood that various other adaptations and modifications may be made within the spirit and scope of the invention. For example, additional system software routines may be used when implementing the invention in various applications. These additional system software routines include dynamic link libraries (DLL), which are program files containing collections of window environment and networking functions designed to perform specific classes of operations. These functions are invoked as needed by the software instrumentation entities to perform desired operations. Specifically, DLLs, which are generally well-known, may be used to interact with the reader entity and operating system to provide services on retrieved performance information.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A run-time data type extension mechanism for describing the kinds of performance information collected within a registry located in a main memory of a computer, the data type extension mechanism comprising:

a base node object of a multi-linked tree data structure stored in the memory, representative of a data item of performance information to be collected, and specifying whether information collection for the data item is enabled;

a buffer element associated with said base node, for storing the collected performance information in the memory while information collection is enabled; and a description element further associated with said base node, for storing in the memory descriptive information regarding the collected performance information, wherein said base node object includes pointers to said buffer element and said description element in the memory.

2. The run-time data type extension mechanism of claim 1 wherein writer entities specify the contents of said buffer and description elements at run time to enable dynamic extension of the kinds of information collected at the registry.

3. The run-time data type extension mechanism of claim 2 wherein the contents comprise values of the collected performance information stored in said buffer element and a description of the collected performance information values in said description element.

4. The run-time data extension mechanism of claim 1, wherein when said base node object indicates that information collection for the data item is enabled, a plurality of memory locations are allocated to said buffer element for storing the collected performance information.

5. The run-time data type extension mechanism of claim 1 wherein data collection presented by each node is independently enabled and disabled.

6. The run-time data type extension mechanism of claim 5 wherein the values of the collected performance information stored in the buffer element change as the performance information specified by the writer entities change, and wherein the abstract data type represented by the node remains constant.

7. A method for describing the types of performance information collected within a registry located in a main memory of a computer, the method comprising the steps of:

providing a base node object of a multi-linked tree data structure stored in the memory representative of a data item of performance information to be collected wherein said base object node also specifies whether collection of information associated with the data item is enabled or disabled;

storing the collected performance information in a buffer element associated with said base node while information collection is enabled, said buffer element located in the memory; and describing the collected performance information in a description element further associated with said base node, said description element resident in memory at a location that is separate and distinct from said buffer element, wherein said base node object includes pointers to said buffer element and said description element.

8. The method of claim 7 further comprising the steps of:

implementing the base node object as a first object in a class hierarchy having an abstract data type associated therewith for collecting the performance information; and extending the abstract data type associated with the first object by creating a second object from a subclass of the hierarchy.

9. The method of claim 8 wherein the step of extending further comprises the step of creating a user-defined abstract data type of said second object comprising a plurality of primitive data types for collecting statistics performance information.

10. The method of claim 9 wherein the step of creating further comprises the step of grouping the statistics collected by the primitive data types together as a magnitude data type.

11. The run time data type extension mechanism of claim 4, wherein when said base node object indicates that information collection for the data item is disabled, said plurality of memory locations are unallocated from said buffer element.

* * * * *